Dec. 11, 1928.

A. M. GOODWIN 1,694,975

AUXILIARY CONTROL MEANS FOR PRIME MOVERS

Filed Nov. 29, 1926

Inventor
Alan M. Goodwin,
by
His Attorney.

Patented Dec. 11, 1928.

1,694,975

UNITED STATES PATENT OFFICE.

ALAN M. GOODWIN, OF BOSTON, MASSACHUSETTS, ASSIGNOR TO GENERAL ELECTRIC COMPANY, A CORPORATION OF NEW YORK.

AUXILIARY CONTROL MEANS FOR PRIME MOVERS.

Application filed November 29, 1926. Serial No. 151,369.

The present invention relates to an auxiliary control means for automatically starting, accelerating and stopping prime movers, and has for its object the provision of an improved means of this character which is dependable in operation and readily adapted to existing prime mover installations and regulating apparatus provided in connection therewith.

The control means of the present invention is particularly adapted for use in connection with automatic hydroelectric generating units which are usually remotely controlled and which must function without operating attention. By way of example the invention is herein described in a control application of this nature and for a consideration of what is believed to be novel and the invention, attention is now directed to the accompanying drawing, the description thereof and the appended claims.

Figure 1:
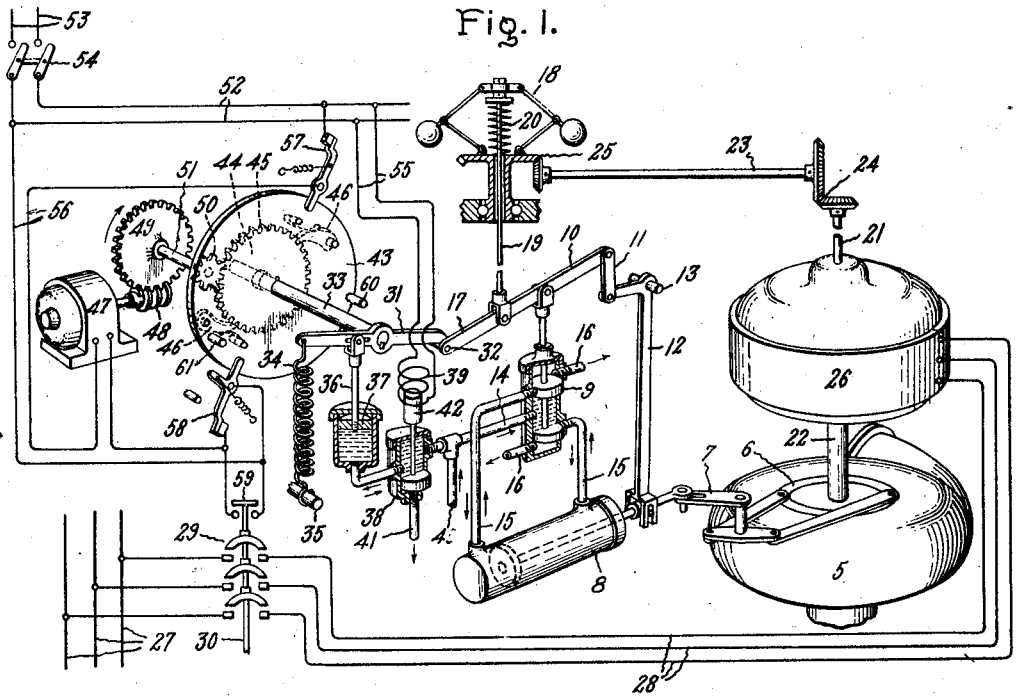
Figure 2:
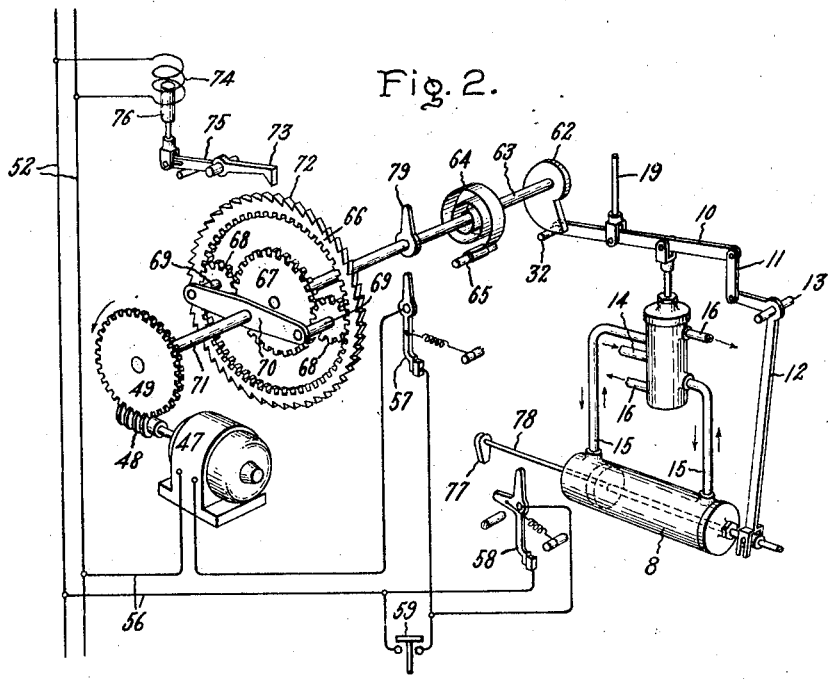

In the drawing, Fig. 1 is a diagrammatical representation of a hydroelectric unit provided with a hydraulic governor and an automatic control means embodying the invention, said control means being adapted to operate in connection with the hydraulic governor and with the aid of the oil pressure supplied thereto, and Fig. 2 is a modification of the control means of Fig. 1 applied to the same hydroelectric unit and governor, but adapted to operate without the aid of the oil pressure.

Referring to Fig. 1, 5 is a water wheel or turbine having a gate control or admission valve means indicated at 6. This is operated by a suitable link and lever means 7 which, in the present example, is connected with a fluid operated or hydraulic servo-motor comprising an operating motor 8 connected with the gate operating means 7, a pilot valve 9 by which the motor and the connected gate mechanism is controlled, a pilot valve lever 10 for operating the pilot valve, and a followup mechanism comprising a link 11 and an L-shaped lever 12 which is pivotally supported at 13. The follow-up mechanism provides a connection between the motor and the pilot valve lever whereby the pilot valve is automatically returned to its neutral or mid-position after each operation, as is well known and understood.

The motor is supplied with oil under pressure as the operating medium, through a pipe 14, under control of the pilot valve, said oil being passed through service conduits 15 to opposite ends of the cylinder to operate the piston, 16 are exhaust conduits for conducting the oil discharged from the cylinder of the pilot valve to any suitable point.

The arrangement is such that when the free end of the pilot valve lever, indicated at 17, is fully depressed as shown in the drawing, the pilot valve operates the motor to close the gates and stop the turbine, while raising said end of the pilot valve lever causes the gates to open a corresponding degree and places the turbine in operation. The speed is then controlled by moving the pilot valve lever in response to changes in load on the turbine, raising the free end of the lever to maintain the speed under increasing load and lowering it for the same purpose with decreasing load.

In the present example the pilot valve lever is placed under control of a fly weight governor 18, representing any suitable operating governor, by a connecting stem 19 which is moved by the fly weights against the biasing action of a spring 20 as the speed increases to depress the free end of the pilot valve lever and thus check the tendency for the speed to increase. In a similar manner it operates to correct for decreases in speed down to the point where the admission means or gates are fully opened. The governor is driven by the turbine from an extension 21 of the turbine shaft 22 through a connecting shaft 23 and suitable gearing 24 and 25.

The turbine drives a direct connected electric generator 26 which supplies energy to power lines 27 through connecting leads 28. A suitable main switch 29 in leads 28, operated by a rod 30 serves to open the connection with the lines when the generator is not in operation, and is shown in the open position.

The governor spring 20 provides a biasing force which at all times tends to move the pilot valve lever in a direction to open the gates and admit motive fluid or water to the turbine. This force is met in operation by that set up by the fly weights so that a balance is effected at substantially the desired speed of the prime mover or generator as is well known and understood and is overcome to stop the prime mover by applying an external force to the pilot valve lever to move it to the position shown. The governor arrangement is thus such that the turbine or prime mover is self-starting upon release of the pilot valve lever from this depressed position.

The speed or operating governor and the self-starting feature are not, however, essential to the operation of the control means of the present invention, but are shown because the arrangement embodying them represents a common form of hydroelectric installation and a convenient and well understood arrangement with which to illustrate the control means of the invention.

One problem in connection with this and similar prime mover installations adapted for self-starting under automatic or remote control, is to provide for the proper acceleration of the prime mover, that is, to provide for the gradual application of motive fluid to the prime mover to bring it up to full speed at the proper rate of increase in speed so that it will not be overstressed at any time or overspeeded before load is taken on by the generator.

In an arrangement such as that of the present example, the starting and acceleration of the prime mover is most conveniently and advantageously effected by the gradual release of the pilot valve lever 10, since it controls the prime mover or water wheel, whereby under the retracting action of spring 20 the free end 17 of the lever is moved or permitted to move from the depressed position shown, to a raised position corresponding to a full gate opening, or to a position wherein the lever comes under control of the fly weights which exert the proper retarding force to maintain a certain desired substantially constant normal speed.

In connection with an arrangement of this type, it has been proposed to limit the starting operation or acceleration by loading the pilot valve lever with a properly arranged oil dash pot having an adjustable needle valve, the rate at which the dash pot permits the pilot valve lever to move as the unit is brought up to speed being set by the needle valve to keep the acceleration within desirable and safe limits.

The operation of the oil dash pot control has been found to be subject to temperature variations, a change in temperature causing a change in the viscosity of the oil and a corresponding difference in the acceleration of the unit. A control means of this type is therefore not wholly dependable in operation, and, in providing the control means of the present invention, this and other disadvantages common to previous types have been considered with the view of eliminating them without involving extensive changes in the apparatus controlled, and without the addition of complicated control means, while insuring dependability in operation, which is an essential characteristic of automatic or remote control apparatus.

Furthermore in providing the control means of the present invention, the necessity for using oil or other fluid as an operating medium is eliminated, although such control means may be readily adapted for use with a prime mover having an oil or hydraulic governor, like that of the present example, as will be seen from a further consideration of Fig. 1.

Referring again to said figure, in connection with the pilot valve lever is provided a motor depressing means and a timing-motor-controlled releasing means therefor, both of which operate jointly on the lever through a depressing and releasing or reset bar 31. One end of the control bar is arranged to engage the free end of the pilot valve lever, the contact between the bar and the lever being taken by a projecting pin 32 secured in the end of the lever. The bar is secured at a point between its ends on one end of a control shaft 33 which rotates or oscillates through a certain arc of movement under control of the depressing and releasing means. The bar extends transversely of the shaft so that as the latter oscillates the end in contact with pin 32 moves to fully depress or fully release the pilot valve lever 10 to effect the control hereinbefore described.

The opposite end of the bar is connected with a retracting spring 34 which is secured to a fixed retaining means 35 and tensioned to exert a constant force on the bar tending to cause it to rotate with the shaft as a center, counterclockwise as viewed in the drawing, and to release the pilot valve lever. The bar is moved clcokwise into and is held in the position shown, against the action of the spring, by a motor means pivotally connected therewith by a rod 36 and comprising an oil pressure operated piston 37 controlled by a suitable two-way valve 38, and a solenoid 39 for operating the valve. The valve takes oil for the piston, through a supply pipe 40 in common with pipe 14, and is provided with a drain or discharge conduit 41.

The valve is self-opening and normally assumes the open position shown to connect the piston with the pressure source, under the weight of the solenoid core 42 with which it is connected. When the solenoid is energized, the core is raised and carries the valve to a position wherein it closes the connection between the piston and the supply pipe 40 and permits the pressure on the piston to be relieved through drain conduit 41. The spring is then free to act upon the bar and tends to rotate it and the shaft 41 in a counterclockwise direction to release the pilot valve lever.

The piston and the solenoid operated valve, in connection with the bar, represent any suitable electrically operated motor means for depressing the pilot valve lever or for moving it from a normal operating position to a position in which the prime mover is stopped.

The motor controlled releasing means, also operating on the pilot valve lever through the control or reset bar, comprises a rotating driving member, such as a disk 43, keyed to the shaft, a second rotating or driven member 44 also mounted on the shaft, but being free to turn thereon, a ratchet and pawl means carried jointly by said members and connecting them, and in this case comprising gear teeth 45 on the second-named or free running member 44, and on the disk member a pair of spring pressed ratchet pawls 46 which engage the gear teeth. This arrangement provides a clutch between control shaft 33 and a small timing motor 47. In addition an irreversible or substantially irreversible reduction gearing serves to connect said motor with the free running member 44 of the clutch means.

In the present example the gearing comprises a worm 48 mounted on the motor shaft, a worm gear 49 driven thereby, a pinion 50 which meshes with the teeth on the free-running member 44 and a shaft 51 to which said worm gear and pinion are secured. The motor operates in a direction to turn the worm wheel 49, shaft 51 and pinion 50 in the direction indicated by the arrow adjacent worm wheel 49.

It should be understood that shaft 51 and also shafts 23 and 33 run in suitable bearings which are not shown. In the diagrammatic representation of the present embodiment of the invention, which has been employed for the purpose of making the drawing clearer and more easily understood, all parts not necessary for a complete understanding of the invention have been omitted.

The timing motor 47 and solenoid 39 which operates to release valve 38, are arranged to be energized and deenergized simultaneously and for this purpose are preferably adapted for a common voltage and current supply. In the present example the motor and solenoid are energized from a pair of control bus wires 52 which receive energy from control lines 53 through a control switch 54. The solenoid is connected directly with the control bus by lead wires 55, while the motor is connected with the control bus through lead wires 56 in which are located two normally closed spring operated limit switches 57 and 58.

The last-named switch is provided with a shunting switch 59 which is controlled by apparatus connected with the operation of the generator. In this case it is connected with the operating rod 30 of the main switch 29 and is closed simultaneously therewith.

The limit switches 57 and 58 may be operated by any suitable moving part of the control means and in the present example are arranged to be operated respectively by projecting pins 60 and 61 carried by the disk. The pins are located to operate the switches at the proper time and in the proper sequence as will appear under the description of the operation which follows:—

With the prime mover stopped and the control means as shown, the prime mover is started by closing control switch 54, which may be located at any suitable point and controlled manually as indicated, or by any suitable means. This energizes the solenoid magnet 39 and permits the release valve 38 to release the oil pressure behind piston 37, and the control bar, shaft and disk tend to rotate counterclockwise under the driving action of spring 34 and also that of the governor spring 20 which are then released from the holding force of the oil pressure. The disk tends to drive the free running member 44 through the pawls 46 which engage the teeth 45 in a direction to drive them. The clutch means is thus closed in this direction and through the meshing engagement with the pinion 50, the free running member tends to drive the motor. It is prevented from doing so by the irreversible worm drive which is permitted to turn only under operation of the motor and at the speed determined thereby. The driving spring 34 is thus held tensioned until motor 47 operates.

The motor is energized and starts simultaneously with the operation of the solenoid of the release valve, so that there is actually no holding of the driving spring but a gradual movement or rotation of the free running member 44 of the clutch which permits the spring driven member 43 thereof and ratchet pawls 46 to follow. This permits the control shaft and control bar to move at a certain fixed rate under the driving force of spring 34. The rate at which the control bar is permitted to move is such that the pilot valve lever is slowly released and permitted to rise under the action of the governor spring 20 to bring the prime mover unit up to speed at a safe rate. This speed is determined by the speed of the motor and by the degree of speed reduction provided by the gearing.

When the unit reaches normal speed or slightly higher than normal speed at no load, a hesitating point or interval is introduced into the starting sequence of operations by stop pin 61 engaging with and opening limit switch 58. This opens the timing motor circuit and stops the motor. The control bar and pilot valve lever are thereby stopped and the speed remains constant until the generator is ready to take on load, which is indicated in the present example by the closing of main switch 29 to connect the generator to the line. Switch 59 is closed simultaneously therewith, and shunts switch 58 to again start the timing motor.

The control bar and pilot valve lever then follow through to a position corresponding to full gate opening. Pin 60 is so located that it engages and opens limit switch 57 at this point thereby stopping the motor. The pilot valve lever then comes under whatever normal operating control means the installation is provided with, which in this case is the operating governor.

In locating stop pin 61 at a suitable position to operate switch 58, it is necessary to operate the prime mover and determine the position of the disk or driving member 43 of the clutch at the speed which is desired prior to taking load. The pin is then secured to the disk in a position wherein it will have opened switch 58 at this speed. However this feature is not essential in all types of prime mover installations, but is desirable in connection with automatic or remotely controlled hydroelectric plants such as that shown.

To stop the prime mover and generator, after opening the main switch 29, control bus 52 is denergized by opening control switch 54. Timing motor 47, already deenergized by the opening of full limit switch 57, is now cut off from the source of control energy and does not operate in stopping the prime mover. The driven or free running member 44 of the clutch is thereby held from rotating through its connection with the irreversible worm and gear 48—49.

At the same time that motor 47 is completely deenergized by the opening of control switch 54, the solenoid magnet of release valve 38 is deenergized and the valve drops to its lower position as shown. This admits oil pressure to piston 37 of the motor means and the control bar is again moved thereby to the position shown, thereby depressing fully the pilot valve lever. This causes the servo-motor to respond and fully close the gates. In this operation the clutch means slips as the ratchet pawls 46 are carried in a clockwise or in an opposite direction from that in which they move to drive the toothed member 44. Limit switches 57 and 58 are also reclosed as shown as the stop pins move with the disk. Driving spring 34 is again put under full tension and the unit and control apparatus are again in readiness to start.

Referring now to Fig. 2, the same governor controlled servo-motor is provided as in Fig. 1 and like parts thereof bear the same reference numerals. The governor and prime mover unit are omitted for the purpose of simplifying the drawing.

In this case the pilot valve lever 10 is controlled in starting and stopping by a releasing and a depressing means which operate in connection with said lever through a cam 62. The cam acts upon the pin 32 in the free end of the pilot valve lever in much the same manner and for the same purpose as the control bar of the arrangement shown in Fig. 1 and like the bar represents any suitable means for moving this control element. The cam is arranged to fully depress or move the pilot valve lever to the full stop position in substantially one revolution about the axis of a control shaft 63 by which it is carried and to which it is secured. This shaft corresponds to control shaft 33 of Fig. 1.

Surrounding control shaft 63 at a point along its length is a coiled spring 64. One end of the spring is secured to the shaft and the other is fixed as indicated at 65. The spring thus forms a spring motor means similar in purpose to the oil pressure motor means of Fig. 1. The spring is unwound in the position shown and in unwinding drives the shaft and cam in a clockwise direction as viewed in the drawing to depress the pilot valve lever.

Shaft 63 is driven in the opposite direction to effect a release of the pilot valve lever and to wind the spring motor, by the timing motor 47 through the irreversible worm gear drive 48—49 as provided in the preceding embodiment, and a clutch means provided by a ratchet controlled epicyclic gear train. The latter comprises an internally toothed free running member or ring 66 and a second or gear member 67 arranged within and concentric therewith.

The ring and gear members are connected by a pair of pinions 68 which lie in meshing engagement with and between them. The pinions are rotatably mounted on short shafts 69 which are secured in parallel relation to each other in the opposite ends of a rotating arm 70. The latter is carried by a shaft 71 which is in turn connected with the worm gear 49. Arm 70 and pinions 68 are thereby held from rotating about the axis of shaft 71 by the irreversible worm and gear except when the motor is operated. Shafts 63 and 71 are coaxial, and axially parallel with shafts 69.

The periphery of ring member 66 is provided with ratchet teeth 72, adjacent which is provided a ratchet pawl 73 which is moved to engage the teeth when actuated by a solenoid magnet 74. The pawl is carried on one end of a pivoted lever 75 with the opposite end of which is pivotally connected the solenoid core 76, in a position to be attracted upwardly when the solenoid is energized. The weight of the core tends to hold the pawl normally retracted as shown.

Motor 47 and solenoid 74 are connected with control bus 52 to be simultaneously energized therefrom as in the preceding embodiment and the motor circuit 56 includes the series limit switches 57 and 58 with the latter shunted by switch 59, all for the purpose described in connection with the preceding embodiment.

In this embodiment, limit switch 58 which is arranged to open at a gate opening corresponding to a desired no-load speed, such as 105% normal speed for example, is arranged to be opened by a finger 77 carried on an extension rod 78 from the gate operating motor 8. Limit switch 57 is operated by an arm 79 secured on shaft 63.

The operation is as follows: With the parts in the positions shown, the prime mover is started by energizing control bus 52. This energizes motor 47 and solenoid 74. Ring member 66 is held from rotation by the pawl 73 as the motor drives arm 70 and pinions 68 in the direction indicated by the arrow adjacent worm gear 49, that is, counterclockwise. By means of pinions 68 this carries gear member 67 and control shaft 63 in the same direction, thereby moving cam 62 to gradually release the pilot valve lever, thus starting and accelerating the prime mover. By the same operation the spring motor 64 is wound or energized.

The accelerating action is interrupted by the opening of limit switch 58 by finger 77 until the unit is ready to take load, when switch 59 is closed and the accelerating action is resumed and continued until the full limit switch 57 is opened. Arm 79 is set on shaft 63 in a position to meet and open switch 57 as the cam fully releases the pilot valve lever. Spring 64 is then fully wound up and tends to rotate shaft 63 in the opposite direction, that is, clockwise as viewed in the drawing, but is prevented from doing so since the ring member 66 is held from rotating by the pawl, and arm 70 carrying pinions 68 is prevented from rotating by the irreversible worm and gear drive between it and the timing motor.

To stop the prime mover unit control bus 52 is deenergized thereby cutting off the motor and solenoid, the former being already deenergized through the previous opening of limit switch 57. With the solenoid deenergized, the ratchet pawl releases ring member 66. This releases the spring motor since ring member 66 is then free to rotate with idler pinions 68 and gear member 67 and permits cam 62 and shaft 63 to rotate under the driving action of the spring motor in a clockwise direction to the position shown thereby depressing the free end of the pilot valve lever and stopping the prime mover. The parts then assume the positions shown in the drawing and the installation is ready to start again upon re-energizing control bus 52.

It will be noted that in this modification the operation of the control means is independent of oil pressure from the hydraulic governor system as the motor means is spring operated and energized by the operation of the timing motor. Thus it is adapted to control prime movers having other forms of governing and throttle operating means not employing a hydraulic servo-motor or the like. However as shown in connection with Fig. 1, a control means embodying the invention is adapted to employ hydraulic pressure in its operation if the same is available and it is desirable or convenient to use it.

From the foregoing consideration of the invention as exemplified in the embodiments shown and described, it will be seen that means are provided for depressing and releasing or moving a control part or means such as the pilot valve lever to properly start and stop the prime mover unit, and includes means for introducing an interval or hesitating point in the starting operation at the desired no-load speed as required in connection with remotely controlled units.

In both embodiments, the timing means is a suitable electric motor coupled to the timing or control shaft by an irreversible gearing and clutch means, the latter being adjacent the control shaft. It should be understood that the gearing is necessarily only sufficiently irreversible to prevent the timing motor from being driven except by the application of operating current to it. This is determined by the friction in the whole gear train or clutch arrangement and the pitch of the worm and worm gear if a worm and worm gear type of irreversible gearing is used.

In both embodiments, the depressing means is controlled by a suitable electrically operated means, such as the solenoid magnet which releases the depressing or moving force when the timing motor is deenergized, and this force then operates to move the control shaft in an opposite direction and the control means or member to the full stop position. In one embodiment this force is supplied by the hydraulic or oil system through a hydraulic motor or piston, and in the other by a wound spring as a motor means which is energized from the starting operation of the timing motor.

It will be seen that the control means of the present invention is simple in construction and is not subject to temperature variations as are oil dash pot controls having small needle valve time setting means. Furthermore the control means of the present invention is adapted for the automatic control of a variety of prime movers, the only requirement being that such prime movers be provided with or be adapted to be provided with a movable control part or member which is movable between limits corresponding to full stop or full speed of the prime mover and which is preferably, but not necessarily, normally moved by some means such as a spring to assume the full speed position.

Thus while the invention has been illustrated and described in connection with a hydroelectric power plant controlled by a hydraulic governor, it should be understood that it is not limited to this application nor to the operating means provided therein.

What I claim as new and desire to secure by Letters Patent of the United States, is:

1. The combination with a prime mover having a control member which is movable in a direction to start and accelerate it, of means connected with said member for controlling its rate of movement in said direction, said means including an electric motor.

2. The combination with a prime mover having a control member which is movable in a direction to start and accelerate it, of means connected with said member for controlling its rate of movement in said direction, said means including an electric motor, and means for returning said member to the starting position.

3. The combination with a prime mover having a control member which is movable to start and accelerate it, of means connected with said member for retarding such movement, said means including an electric motor, means for returning said member to the starting position, said means being electrically controlled, and a common control means therefor and for the electric motor.

4. The combination with a fluid-operated governor for a prime mover comprising a servo-motor having a pilot valve lever and a speed governor connected therewith, of an auxiliary control means therefor, comprising a control member which is carried into engagement with the pilot valve lever to depress the same, and an electric timing motor connected with said control member to carry the same in a direction to effect a release of the pilot valve lever.

5. The combination with an operating control means for a prime mover having a control member which is movable to start, accelerate and stop the prime mover, of a motor means connected with said member for moving it to stop the prime mover, and a second motor means connected with said member for moving it to start and accelerate the prime mover, said second motor means including an electric timing motor for controlling the rate of movement thereof.

6. The combination with an operating control means for a prime mover having a control member which is movable to start, accelerate and stop the prime mover, of a motor means connected with said member for moving it to stop the prime mover, a second motor means connected with said member for moving it to start and accelerate the prime mover, said second motor means including an electric timing motor for controlling the rate of movement thereof, and means connected with both of said motor means for controlling them simultaneously.

7. The combination with an operating control means for a prime mover having a control member which is movable to start, accelerate and stop the prime mover, of a motor means connected with said member for moving it to stop the prime mover, a second motor means connected with said member for moving it to start and accelerate the prime mover, means providing a clutch between one of said motor means and the control member, and means connected with both of said motor means for controlling both simultaneously.

8. The combination with an operating control means for a prime mover having a control member which is movable to start, accelerate and stop the prime mover, of a motor means connected with said member for moving it to stop the prime mover, a second motor means connected with said member for moving it to start and accelerate the prime mover, a current-responsive device connected with said first-named motor means to control the same, an electric motor in said second motor means, a common control bus to which said device and motor are connected, and a switch for energizing and deenergizing said control bus.

9. The combination with an operating control means for a prime mover comprising a releasable member for starting and accelerating said prime mover, of a motor means connected therewith for gradually releasing the same, said means comprising a control member which is carried into engagement with the releasable member to depress the same, an electric timing motor connected with said control member to carry the same in a direction to effect a release of the first-named member, and a clutch means in said connection.

10. The combination with an operating control means for a prime mover comprising a releasable member for starting and accelerating said prime mover, of a motor means for controlling said member, said means comprising a control member which is carried into engagement with the releasable member to depress the same, an electric timing motor connected with said control member to carry the same in a direction to effect a release of the first-named member, a clutch means in said connection, and an electrically controlled motor means for carrying said member in the first-named direction.

11. The combination with an operating control means for a prime mover comprising a releasable member for starting and accelerating said prime mover, of a motor means for controlling said member, said means comprising a rotatable shaft, a control member which is carried thereby into engagement with the releasable member to depress the same, an electric timing motor connected with said shaft to rotate the same in a direction to effect a release of the first-named member, a clutch means in said connection, and an electrically controlled motor means for rotating said shaft in the opposite direction.

12. The combination with an operating control means for a prime mover, of a rotatable shaft, a control member mounted thereon to rotate therewith, said member being connected with the control means to actuate the same, a motor means connected with said shaft to rotate it in one direction, an electric timing motor connected with said shaft to rotate it in the opposite direction, a substantially irreversible reduction gearing in said connection adjacent the timing motor, a clutch means in said connection adjacent the shaft, and electrically operated means for controlling the first-named motor means.

13. The combination with an operating control means for a prime mover, of a rotatable shaft, a control member mounted thereon to rotate therewith, said member being connected with the control means to actuate the same, a motor means connected with said shaft to rotate it in one direction, an electric timing motor connected with said shaft to rotate it in the opposite direction, a substantially irreversible reduction gearing in said connection adjacent the timing motor, a clutch means in said connection adjacent the shaft, electrically operated means for controlling the first-named motor means, and a control bus with which the timing motor and said electrically operated control means are connected.

14. The combination with a control means for a prime mover having a control member which is movable between limits in one direction to fully stop the prime mover and in the opposite direction to put the prime mover into operation, of an electrically controlled motor means for moving said control member in the first-named direction, an electric timing motor means for controlling movement of said member in the opposite direction, a control shaft with which said motor means and timing motor are connected, means carried by said shaft for actuating said control member, a substantially irreversible gearing and a clutch means interposed in the connection between said timing motor and said shaft, and a control bus to which said timing motor and electrically controlled motor means are connected.

15. The combination with a control means for a prime mover having a control member which is movable between limits in one direction to fully stop the prime mover and in the opposite direction to put the prime mover into operation, of a motor means for moving said control member in the first-named direction, an electromagnet controlling said motor means, an electric timing motor means for controlling movement of said member in the opposite direction, a control shaft with which said motor means and timing motor are connected, means carried by said shaft for actuating said control member, a substantially irreversible gearing and a clutch means interposed in the connection between said timing motor and said shaft, and a control bus to which said timing motor and electromagnet are connected.

16. The combination with a control means for a prime mover having a control member which is movable between limits in one direction to fully stop the prime mover and in the opposite direction to put the prime mover into operation, of a motor means for moving said control member in the first-named direction, an electromagnet controlling said motor means, an electric timing motor means for controlling movement of said member in the opposite direction, a control shaft with which said motor means and timing motor are connected, means carried by said shaft for actuating said control member, a substantially irreversible gearing and a clutch means interposed in the connection between said timing motor and said shaft, a control bus to which said timing motor and electromagnet are connected, and means for energizing and deenergizing said control bus.

17. The combination with a prime mover having a fluid operated governor provided with a pilot valve lever, of a control means for depressing and releasing said lever to stop and start the prime mover, said means comprising a rotatable control shaft, a control member carried by the shaft and being rotatable therewith to depress and to release said lever, a spring for rotating said shaft in one direction, a fluid operated motor means for rotating said shaft in the opposite direction, a valve controlling said motor means, electromagnetic means for operating said valve, a timing motor for permitting said spring to rotate the shaft at a certain rate, an irreversible gearing connecting said motor with the shaft, and a clutch in said connection adjacent said shaft.

18. The combination with a prime mover having a fluid operated governor provided with a pilot valve lever, of a control means for depressing and releasing said lever to stop and start the prime mover, said means comprising a rotatable control shaft, a control member carried by the shaft and being rotatable therewith to depress and release said lever, a spring for rotating said shaft in one direction, a fluid operated motor means for rotating said shaft in the opposite direction, a valve controlling said motor means, electromagnetic means for operating said valve, a timing motor for permitting said spring to rotate the shaft at a certain rate, an irreversible gearing connecting said motor with the shaft, a clutch in said connection adjacent said shaft, said clutch comprising a disk member which rotates with and is carried by said shaft, a toothed member connected with said gearing, and ratchet pawls carried by said disk engaging said toothed member, a limit switch in circuit with the timing motor, and means carried by the disk member for opening said switch at a predetermined point in its rotative travel.

In witness whereof, I have hereunto set my hand this twenty fourth day of November 1926.

ALAN M. GOODWIN.